(12) United States Patent
Kalisz et al.

(10) Patent No.: US 8,474,868 B2
(45) Date of Patent: Jul. 2, 2013

(54) ACTIVE BOLSTER WITH HERMETIC SEAL

(75) Inventors: Raymond E. Kalisz, Livonia, MI (US); Jeffery N. Conley, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

(21) Appl. No.: 13/089,401

(22) Filed: Apr. 19, 2011

(65) Prior Publication Data

US 2012/0267878 A1 Oct. 25, 2012

(51) Int. Cl.
*B60R 21/215* (2011.01)

(52) U.S. Cl.
USPC .......... 280/753; 280/732; 280/728.3

(58) Field of Classification Search
USPC ........... 280/728.2, 728.3, 730.1, 732, 743.1, 280/753; 277/316, 628, 637
See application file for complete search history.

(56) References Cited

U.S. PATENT DOCUMENTS

| | | | |
|---|---|---|---|
| 6,032,978 A | 3/2000 | Spencer et al. | |
| 6,203,057 B1 | 3/2001 | Spencer et al. | |
| 6,213,497 B1 | 4/2001 | Spencer et al. | |
| 6,758,493 B2 | 7/2004 | Conlee et al. | |
| 7,234,726 B2 * | 6/2007 | Trevino et al. | 280/728.3 |
| 7,556,285 B1 * | 7/2009 | Hayashi | 280/728.3 |
| 7,631,890 B1 * | 12/2009 | Kalisz et al. | 280/728.3 |
| 7,810,602 B2 | 10/2010 | Evans | |
| 2002/0008368 A1 * | 1/2002 | Kurimoto | 280/728.2 |
| 2003/0047915 A1 * | 3/2003 | Sun et al. | 280/728.2 |
| 2005/0052002 A1 * | 3/2005 | Hayashi et al. | 280/728.3 |
| 2006/0131844 A1 * | 6/2006 | Trevino et al. | 280/728.3 |
| 2006/0255569 A1 * | 11/2006 | Weissert et al. | 280/728.3 |
| 2008/0100038 A1 * | 5/2008 | Finch et al. | 280/728.2 |
| 2008/0164681 A1 | 7/2008 | Nuthalapati | |
| 2009/0152848 A1 | 6/2009 | Sadr et al. | |
| 2009/0152849 A1 | 6/2009 | Saraf et al. | |
| 2009/0284041 A1 | 11/2009 | Hall et al. | |

(Continued)

FOREIGN PATENT DOCUMENTS

WO WO200711787 A1 10/2007

OTHER PUBLICATIONS

Raj S. Roychoudhury et al., Blow-Molded Plastic Active Knee Bolsters, SAE Technical Paper Series 2004-01-0844, Mar. 8-11, 2004, pp. 1-9.
Bijoy K. Saraf, et al., Active Bolster for Side Impact Protection, SAE Technical Paper Series 2008-01-0191, Apr. 14-17, 2008, pp. 1-11.

*Primary Examiner* — Karen Beck
(74) *Attorney, Agent, or Firm* — Vichit Chea

(57) ABSTRACT

An active bolster for an automotive vehicle has base wall for mounting against a rigid structure of the vehicle. A front wall overlies the base wall and forms an interior trim piece of the vehicle. The base wall has a first surface facing the front wall, and the front wall has a second surface facing the base wall. The base wall and front wall are joined around a closed perimeter to form an inflatable bladder with an initial open space between the first and second surfaces. The base wall includes a wide rib projecting from the first surface continuously along the closed perimeter, the wide rib having a minimum radial width along the closed perimeter equal to a first predetermined radial width. The front wall includes a plurality of narrow ribs projecting concentrically from the second surface continuously along the closed perimeter. Each narrow rib is welded to the wide rib, and each narrow rib has a respective radial width at each respective location along the closed perimeter less than half the radial width of the wide rib at the respective location.

21 Claims, 4 Drawing Sheets

U.S. PATENT DOCUMENTS

| | | |
|---|---|---|
| 2010/0207370 A1 | 8/2010 | Haba et al. |
| 2010/0326782 A1 | 12/2010 | VandenBerge et al. |
| 2011/0272926 A1* | 11/2011 | Roychoudhury et al. .. 280/728.2 |
| 2011/0316300 A1* | 12/2011 | Kalisz ........................ 296/37.12 |
| 2012/0248741 A1* | 10/2012 | Kalisz ........................ 280/728.2 |
| 2012/0267878 A1* | 10/2012 | Kalisz et al. ............... 280/728.2 |

* cited by examiner

ACTIVE BOLSTER WITH HERMETIC SEAL

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to a circumferential hermetic seal between two plastic panels the forms an inflatable bladder for an active bolster.

An active bolster is a vehicle occupant protection device with a gas-inflatable bladder to absorb impacts and reduce trauma to occupants during a crash. As opposed to deploying air bag cushions through various openings, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive.

In a typical structure, an active bolster includes a front wall or panel that faces a vehicle occupant and that is attached to a base wall or panel along a sealed periphery. One or both of the walls is deformable in order to provide an inflatable bladder. For example, the base wall may have a zig-zag or accordion region that straightens out during inflation. The walls are initially spaced apart by a small amount when in their pre-deployment, non-inflated condition. This allows ingress of the inflation gas in a manner that achieves even inflation across the panel.

The front and base walls of a typical active bolster are comprised of molded thermoplastics such as polyethylene, polyolefin, or PVC. They can be blow molded or injection molded. The front and base walls must be hermetically joined around their periphery in order to form the inflatable bladder. The joint must be strong to resist separation as a result of the high pressures during inflation.

From a manufacturing standpoint, welding (such as hot plate, ultrasonic, friction, or laser welding) is a desirable method for attaching the front and base walls. In order to provide welding surfaces, a raised circumferential rib or rampart on one wall may be used to extend into contact with a matching raised rib on the other wall. However, such a weld would have to withstand large shear forces during inflation, and a failure of the weld could result in complete loss of the ability to absorb an impact.

SUMMARY OF THE INVENTION

The present invention employs welding surfaces that provide an improved penetration between the welded parts as well as redundancy within the weld to achieve greater safety and reliability of the active bolster.

In one aspect of the invention, an active bolster is provided for an automotive vehicle. A base wall is provided for mounting against a rigid structure of the vehicle. A front wall overlies the base wall and forms an interior trim piece of the vehicle. The base wall has a first surface facing the front wall, and the front wall has a second surface facing the base wall. The base wall and front wall are comprised of molded plastic components. They are joined around a closed perimeter to form an inflatable bladder with an initial open space between the first and second surfaces. The base wall includes a wide rib projecting from the first surface continuously along the closed perimeter, the wide rib having a minimum radial width along the closed perimeter equal to a first predetermined radial width. The front wall includes a plurality of narrow ribs projecting concentrically from the second surface continuously along the closed perimeter. Each narrow rib is welded to the wide rib, and each narrow rib has a respective radial width at each respective location along the closed perimeter less than half the radial width of the wide rib at the respective location.

DETAILED DESCRIPTION OF PREFERRED EMBODIMENTS

Figure 1:
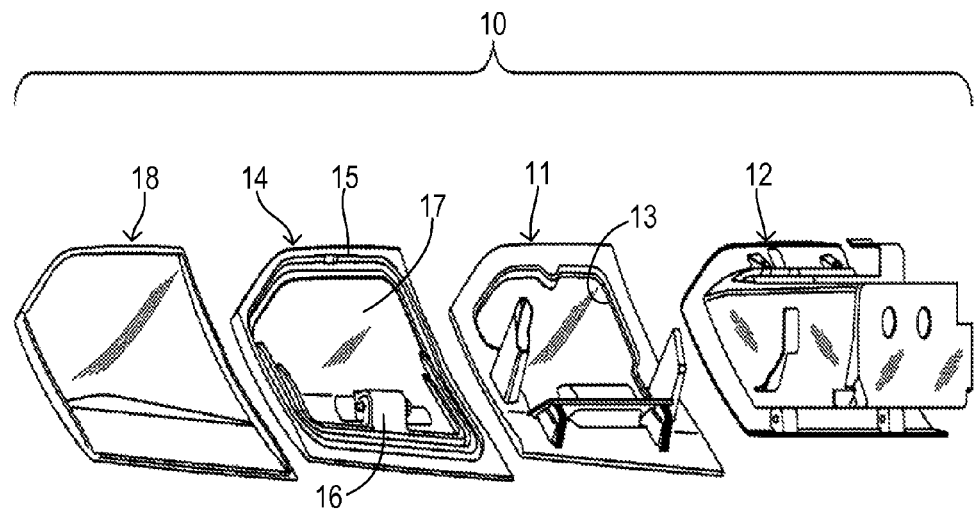
FIG. 1 is an outward-looking, exploded perspective view of an active knee bolster glove box door system of a type to which the present invention can be applied.

Referring now to FIG. 1, a prior art active knee bolster system 10 has a base panel component 11 which forms the foundation for the bolster. Base 11 may be either attached to the vehicle by hinging from a storage cavity or glove box 12 as shown in FIG. 1, or mounted to another structure such as an instrument panel support below a steering column, for example. Such locations are accessible to the knees of an individual riding in a corresponding seating position within a vehicle.

Base 11 has a periphery 13 adapted to be sealed to a front panel component 14 having a matching perimeter 15. Base 11 and front 14 are preferably comprised of molded plastics and may be joined by plastic welding, such as hot plate welding, to form a peripheral seal around an interior open space 17 for forming a bladder. An inflation gas source 16 is electronically controlled for activating during a crash to release gas to inflate the bolster. Front 14 may comprise the interior trim surface (e.g., the outside of the glove box door), or an additional skin 18 can be applied to the outer surface (i.e., Class A surface) of front panel 14. Skin 18 is preferably constructed of plastic and may be a vacuum formed thermoplastic bilaminate that may be grained or otherwise finished.

Figure 2:
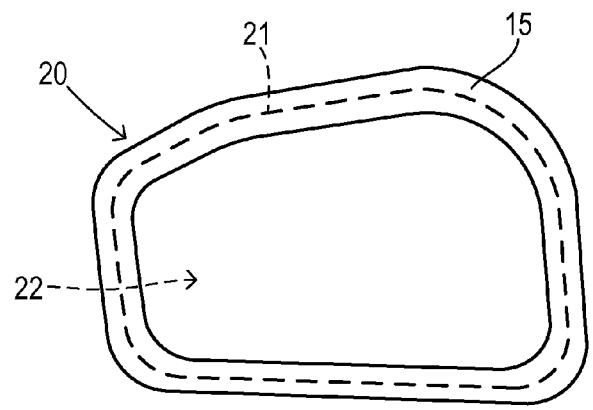
FIG. 2 is a plan view of a base and front wall assembly showing the location of a closed perimeter weld forming an internal bladder.

FIG. 2 shows an assembly 20 of a base panel and a front panel. Around its periphery 15, an internal weld 21 is formed between the panels resulting in an internal inflatable bladder 22. When inflator 16 releases gas into bladder 22, the expanding gas causes expansion of bladder 22 resulting in sheer stress being applied to weld 21. Weld failure results in loss of the seal and degraded performance of the bolster.

Figure 3:
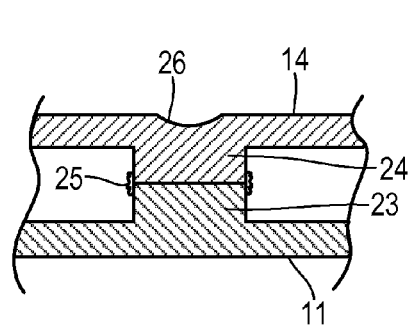
FIG. 3 is a cross section of a weld wherein the front and base walls having a matching rib.

In typical hot plate welding, matching ribs are employed as shown in FIG. 3. Thus, back and front walls 11 and 14 include matching ribs 24 and 23 which are hot welded at 25. The strength of such a weld is proportional to the width of the ribs (i.e., the surface area of the weld). In injection molded parts having a thin wall with a smooth front surface and projections extending from the rear surface, an undesirable sink 26 is potentially created in the front surface corresponding to the location of the projections. If the width of matching ribs is kept low to avoid the sinks, an insufficient weld strength may result. The present invention has discovered that weld strength can be improved by using other than a matching width for the ribs, so that high strength and avoidance of sinks can be simultaneously obtained.

Figure 4:
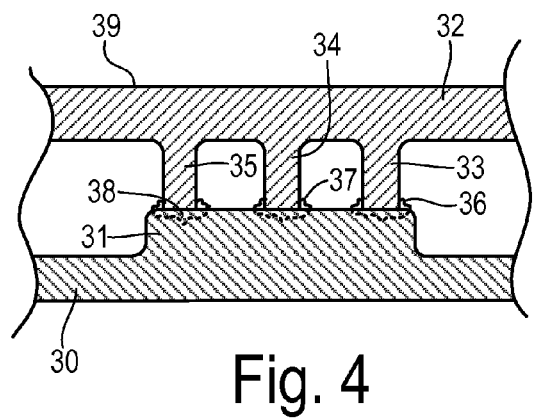
FIG. 4 is a cross section showing an improved weld wherein narrow ribs are joined to a wide rib to provide deeper penetration or "bite" in the weld.

As shown in FIG. 4, a wall 30 includes a wide rib 31. Wall 30 may preferably be the base wall since if it is the base wall then any sink appearing on the outer surface corresponding to rib 31 would not be on a visible surface of the finished component. A second wall 32 includes a plurality of ribs 33, 34, and 35 that are hot welded to wide rib 31 at welds 36, 37, and 38. Ribs 31 and 33-35 project from their respective surfaces continuously along the closed perimeter of the walls to provide the continuous seal between them. If wall 32 is the front wall, then its outer or "Class A" visible surface 39 remains smooth without any sinks forming opposite from ribs 33-35.

Figure 5:
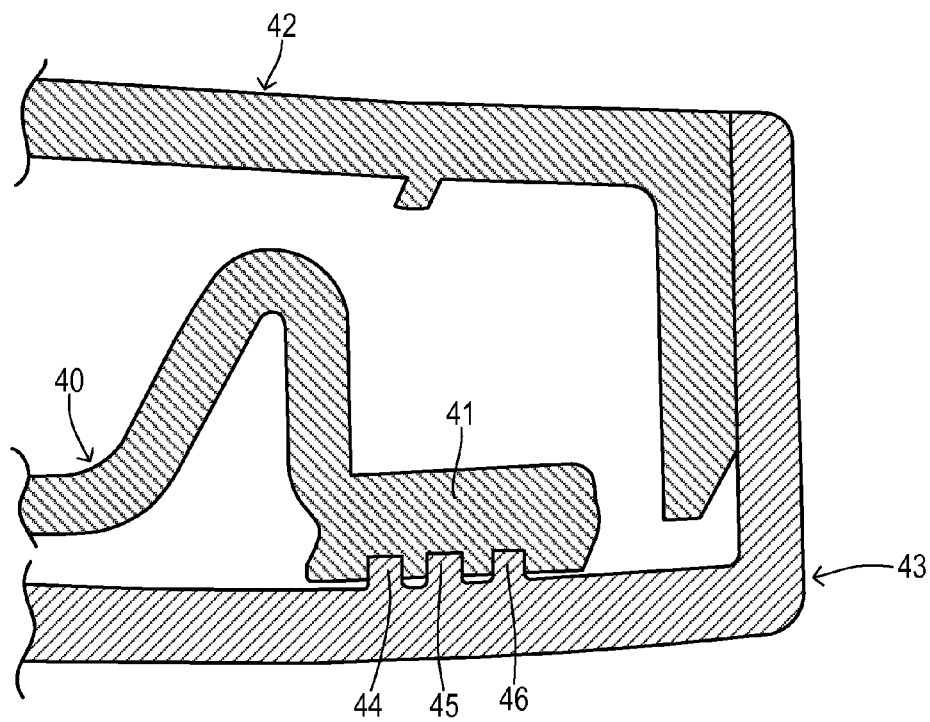
FIG. 5 is a cross section of another embodiment of the weld.

FIG. 5 shows an embodiment wherein a base wall 40 has a wide rib 41. Base wall 40 is mounted to a support structure 42 such as a glove box door. Front wall 43 includes narrow ribs 44, 45, and 46 which penetrate or "bite" into wide rib 41. As a result, the weld achieves better penetration, more surface area, increased strength, and redundancy of the seal.

Figure 6:
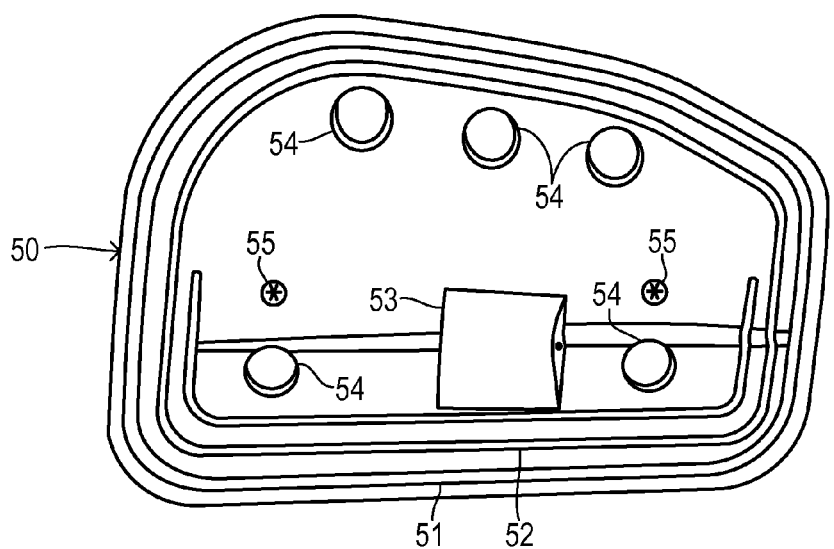
FIG. 6 is a plan view of the internal surface of a base wall of an alternative embodiment having a plurality of narrow ribs.

FIG. 6 shows an alternative embodiment wherein a back wall 50 may include narrow ribs 51 and 52 for matching a wide rib on a front wall (not shown). A molded receptacle 53 receives a gas canister. A plurality of frangible tabs 54 extend into contact with the front wall to form tearable joints between the walls, and may be welded in the same operation as ribs 51 and 52. A pair of vents 55 are provided for controllably venting gas during impact of a passenger against the bolster.

Various size relationships of the wide rib and narrow ribs are shown in FIG. 7. FIG. 7A shows a first wall 60 with a wide rib 61 having a radial width W. The cross-section of FIG. 7A is taken across the circumferential direction in which rib 61 extends.

Figure 7D:
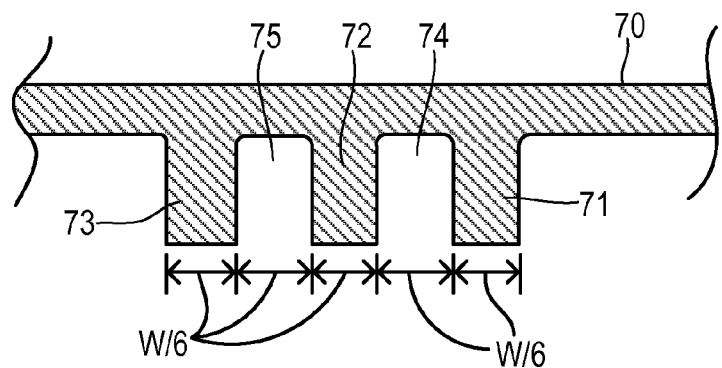
FIG. 7A is a cross section of a wide rib and FIGS. 7B-D are cross sections of various embodiments of narrow ribs.
Figure 7C:
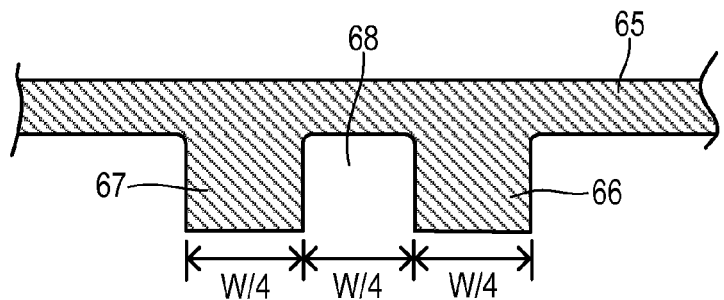
Figure 7B:
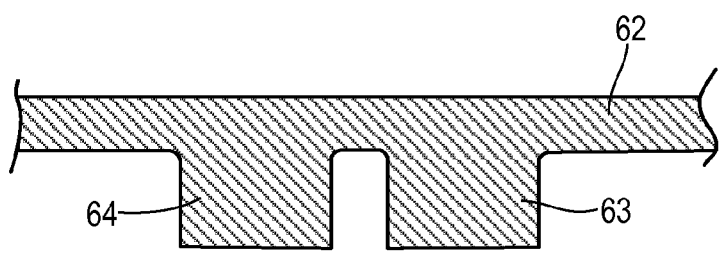
Figure 7A:
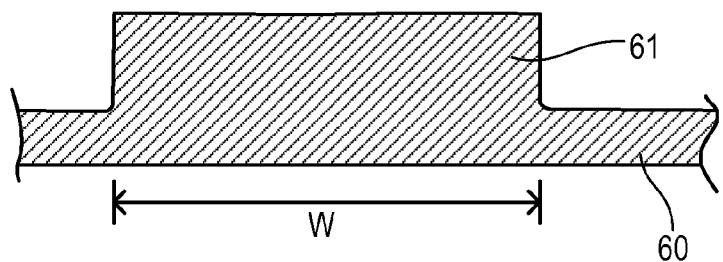

A first embodiment of an opposing wall 62 is shown in FIG. 7B. Narrow ribs 63 and 64 match up within the edges of radial width W of wide rib 61. The radial width of wide rib 61 is not required to be constant all the way around the perimeter, and for various reasons it may vary at different locations along the closed perimeter. At some location however, the wide rib has a radial width W equal to a minimum width according to the required weld strength. Each narrow rib has a respective radial width at each respective location along the close perimeter that is less than half the radial width of the wide rib at that respective location (thereby allowing two ribs to always fit within the boundary of the wide rib). In addition, each narrow rib preferably has a respective radial width small enough to avoid sinks appearing in the outer surface of the wall whenever that surface is part of a Class A surface.

FIG. 7C shows a more constrained embodiment wherein a wall 65 has a pair of narrow ribs 66 and 67 on opposite sides of a gap 68. Each narrow rib 66 and 67 and gap 68 have a radial width equal to or less than about ¼ the radial width W. Ribs 66 and 67 are evenly spaced and centered with respect to wide rib 61, so that outer portions of rib 61 extend radially beyond the edges of narrow ribs 66 and 67 so that both ribs penetrate into wide rib 61. The narrow ribs could alternatively be unevenly spaced.

FIG. 7D shows an embodiment wherein a wall 70 includes three narrow ribs 71, 72, and 73 with intervening gaps 74 and 75, wherein each has a radial width less than or equal to about ⅙ of radial width W.

Figure 8:
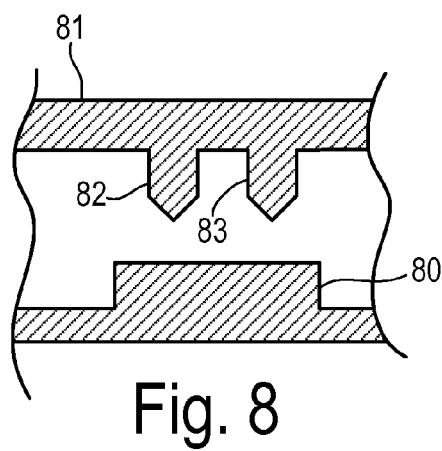
FIGS. 8 and 9 are cross sections showing narrow ribs with wedge shapes.
Figure 9:
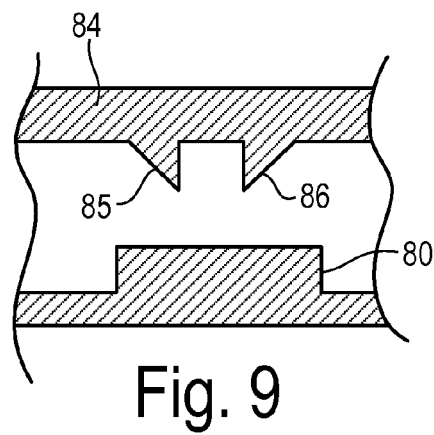

The shape of the narrow ribs may be modified from the rectangular, flat top rib shown above. FIG. 8 shows a wedge shape with a pointed tip for promoting penetration into the wide rib. Specifically, a wide rib 80 is provided on one wall. A second wall 81 has wedge-shaped narrow ribs 82 and 83. FIG. 9 shows another wedge shape in which narrow ribs 85 and 86 each have a vertical side and an angled side. As shown, the vertical sides can be facing opposite directions.

Figure 10:
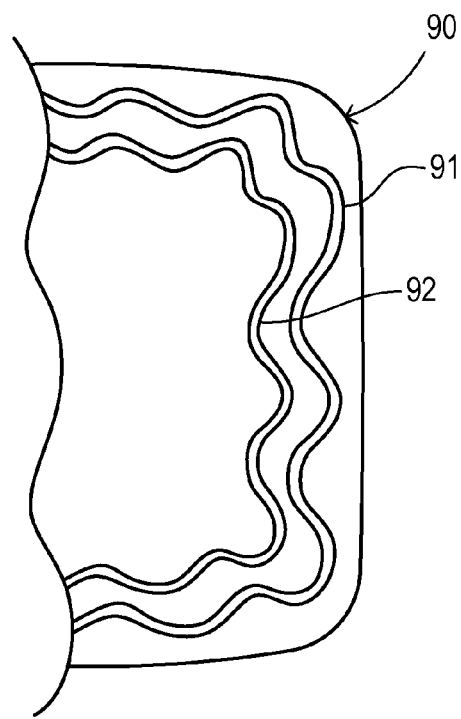
FIGS. 10 and 11 are plan views showing undulating paths for the hermetic seal around the perimeter of the inflatable bladder.
Figure 11:
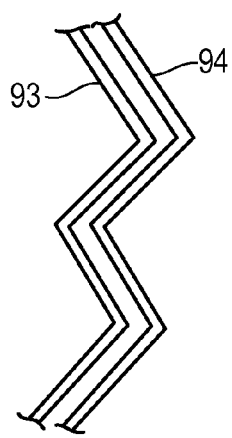

A further improvement in weld strength can be achieved using an undulating path of the ribs around the perimeter. FIG. 10 shows a panel wall 90 with a pair of narrow ribs 91 and 92 that follow a wavy path. The wide rib on the other wall (not shown) follows a matching path. FIG. 11 shows an alternative undulating path wherein a pair of narrow ribs 93 and 94 follow a zig-zag path. These modified paths can be used around the complete perimeter or only over portions of it.

The active bolster of the present invention can be manufactured using established methods. A base panel having a base wall is preferably injection molded from a plastic material for mounting against a rigid structure of the vehicle. The base wall has a first surface facing away from the rigid structure and includes a wide rib projecting from the first surface continuously along the closed perimeter. A front panel having a front wall is preferably injection molded from a similar or the same plastic material which is compatible for hot welding. When overlying the base wall to form an interior trim piece of the vehicle, a plurality of narrow ribs projecting concentrically from a second surface of the front wall continuously match up with the wide rib along the closed perimeter. Each narrow rib has a respective radial width at each respective location along the closed perimeter less than half the radial width of the wide rib at the respective location. The narrow ribs are hot welded with the wide rib so that the base wall and front wall are joined around a closed perimeter to form an inflatable bladder with an initial open space between the first and second surfaces. For hot plate welding, the base and front walls are loaded into a fixture with the ribs aligned. A hot plate is sandwiched between the two components in contact with the ribs. After heating to a desired temperature, the hot plate is removed and the ribs are pressed together. The narrow ribs penetrate the wide rib to create the hermetic seal of the invention.

What is claimed is:

1. An active bolster for an automotive vehicle, comprising:
   a deformable base wall for mounting against a rigid structure of the vehicle; and
   a front wall overlying the base wall and forming an interior trim piece of the vehicle;
   wherein the base wall has a first surface facing the front wall, and the front wall has a second surface facing the base wall;
   wherein the base wall and front wall are comprised of molded plastic components, and the base wall and front wall are joined around a closed perimeter by a hermetic seal to form an inflatable bladder with an initial open space between the first and second surfaces, wherein the open space is configured to receive an inflation gas to expand the walls and remain sealed during a deployment of the active bolster;

wherein a first one of the base wall and the front wall includes a wide rib projecting from the first surface continuously along the closed perimeter, the wide rib having a predetermined radial width along the closed perimeter;

wherein a second one of the base wall and the front wall includes a plurality of narrow ribs projecting concentrically from the second surface continuously along the closed perimeter, wherein each narrow rib is welded to the wide rib to form the hermetic seal, and wherein each narrow rib has a respective radial width at each respective location along the closed perimeter less than half the radial width of the wide rib at the respective location.

2. The active bolster of claim 1 wherein the plurality of narrow ribs consists of two narrow ribs, each narrow rib having a respective radial width at each respective location along the closed perimeter less than or equal to one fourth the radial width of the wide rib at the respective location.

3. The active bolster of claim 1 wherein the plurality of narrow ribs consists of three narrow ribs, each narrow rib having a respective radial width at each respective location along the closed perimeter less than or equal to one sixth the radial width of the wide rib at the respective location.

4. The active bolster of claim 1 wherein the base wall and the front wall are injection molded, and wherein the narrow ribs and wide rib are hot welded.

5. The active bolster of claim 1 wherein the active bolster is a knee bolster with the front wall configured to cushion a knee area of an occupant of the automotive vehicle.

6. The active bolster of claim 5 wherein the base wall and front wall are coupled to a glove box door.

7. The active bolster of claim 1 wherein the base wall and front wall are configured to be coupled to an inside door panel of the automotive vehicle.

8. The active bolster of claim 1 further comprising an outer skin attached to the front wall for providing a Class A surface of the automotive vehicle.

9. The active bolster of claim 1 wherein the wide rib and narrow ribs are welded together by hot plate welding.

10. The active bolster of claim 1 further comprising a plurality of frangible tabs between the base wall and the front wall within the initial open space, wherein the frangible tabs are welded at respective joints formed when the wide rib and narrow ribs are welded.

11. The active bolster of claim 1 wherein the narrow ribs are wedge shaped.

12. The active bolster of claim 1 wherein the wide rib and narrow ribs follow an undulating path.

13. A method of manufacturing an active bolster for an automotive vehicle, comprising the steps of:

injection molding a deformable base wall for mounting against a rigid structure of the vehicle, wherein the base wall has a first surface facing away from the rigid structure, wherein the base wall is comprised of plastic and includes a wide rib projecting from the first surface continuously along the closed perimeter, the wide rib having a predetermined radial width along the closed perimeter;

injection molding a front wall overlying the base wall and forming an interior trim piece of the vehicle, wherein the front wall has a second surface facing the base wall, wherein the front wall is comprised of plastic and includes a plurality of narrow ribs projecting concentrically from the second surface continuously along the closed perimeter, and wherein each narrow rib has a respective radial width at each respective location along the closed perimeter less than half the radial width of the wide rib at the respective location;

hot welding the narrow ribs to the wide rib so that the base wall and front wall are joined by a hermetic seal around a closed perimeter to form an inflatable bladder with an initial open space between the first and second surfaces, wherein the open space is configured to receive an inflation gas to expand the walls and remain sealed during a deployment of the active bolster.

14. The method of claim 13 wherein the plurality of narrow ribs consists of two narrow ribs, each narrow rib having a respective radial width at each respective location along the closed perimeter less than or equal to one fourth the radial width of the wide rib at the respective location.

15. The method of claim 13 wherein the plurality of narrow ribs consists of three narrow ribs, each narrow rib having a respective radial width at each respective location along the closed perimeter less than or equal to one sixth the radial width of the wide rib at the respective location.

16. The method of claim 13 wherein the step of hot welding is comprised of hot plate welding.

17. The method of claim 13 wherein at least one of the base wall or front wall includes a plurality of tabs for attaching the base wall and front wall within the initial open space, the method further comprising the step of:

welding the plurality of tabs to form frangible interconnections that break during inflation of the inflatable bladder.

18. A vehicular bolster, comprising:

deformable base and front walls hermetically-sealed around a closed perimeter;

the base wall including a wide rib along the closed perimeter having a predetermined width;

the front wall including concentric narrow ribs along the closed perimeter, each narrow rib being welded to the wide rib and having a width less than half the width of the wide rib, whereby the welded seal of the ribs defines an inflatable bladder.

19. The active bolster of claim 18 wherein the narrow ribs consist of two narrow ribs, each narrow rib having a respective width along the closed perimeter less than one fourth the width of the wide rib.

20. The active bolster of claim 18 wherein the narrow ribs consist of three narrow ribs, each narrow rib having a respective width along the closed perimeter less than one sixth the width of the wide rib.

21. The active bolster of claim 18 wherein the wide rib and narrow ribs are welded together by hot plate welding.

* * * * *